United States Patent
Buchner et al.

(10) Patent No.: US 10,911,523 B2
(45) Date of Patent: Feb. 2, 2021

(54) BROADCAST INTENT SIGNALING USING A DECENTRALIZED NETWORK

(71) Applicant: MICROSOFT TECHNOLOGY LICENSING, LLC, Redmond, WA (US)

(72) Inventors: Daniel James Buchner, Los Gatos, CA (US); Brandon Murdoch, Reading (GB); Ankur Patel, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/356,752

(22) Filed: Mar. 18, 2019

(65) Prior Publication Data
US 2020/0304560 A1 Sep. 24, 2020

(51) Int. Cl.
| | | |
|---|---|---|
| *H04L 29/06* | (2006.01) | |
| *H04L 29/08* | (2006.01) | |
| *H04L 12/18* | (2006.01) | |
| *G06Q 30/02* | (2012.01) | |

(52) U.S. Cl.
CPC .............. *H04L 67/10* (2013.01); *H04L 12/18* (2013.01); *H04L 12/185* (2013.01); *H04L 12/1813* (2013.01); *H04L 12/1822* (2013.01); *H04L 63/0876* (2013.01); *H04L 63/0884* (2013.01); *G06Q 30/0276* (2013.01)

(58) Field of Classification Search
CPC ....... H04L 63/06; H04L 63/12; H04L 9/0637; H04L 9/3226; H04L 12/18; H04L 29/06; H04L 12/185; H04L 12/1813; H04L 12/1822; H04L 67/10; H04L 63/0876; H04L 63/0884; G06Q 30/0255; G06Q 20/0658; G06Q 30/0276
See application file for complete search history.

(56) References Cited

U.S. PATENT DOCUMENTS

| | | | |
|---|---|---|---|
| 2016/0019614 A1* | 1/2016 | Dziuk | G06Q 30/0613 705/38 |
| 2017/0250972 A1 | 8/2017 | Ronda et al. | |
| 2018/0075527 A1 | 3/2018 | Nagla et al. | |
| 2018/0345149 A1* | 12/2018 | Farudi | A63F 13/335 |

(Continued)

OTHER PUBLICATIONS

"International Search Report and Written Opinion Issued in PCT Application No. PCT/US2020/015748", dated May 7, 2020, 12 Pages.

*Primary Examiner* — Le H Luu
(74) *Attorney, Agent, or Firm* — Workman Nydegger (57) ABSTRACT

Embodiments disclosed herein are related to computing systems and methods for broadcasting an intent of a first user to a second user of a decentralized network. The computing system and methods are implemented in the decentralized network that implements a distributed ledger that backs one or more decentralized identities (DID) for one or more users of the computing system. Intent from first users of the computing system is received. The intent data defines potential interactions between the first users and second users of the computing system. Broadcast messages are generated. The broadcast messages include a DID for each of the first users and information specifying the potential interactions. The generated broadcast messages are provided to the second users.

20 Claims, 5 Drawing Sheets

(56) References Cited

U.S. PATENT DOCUMENTS

| | | |
|---|---|---|
| 2019/0012662 A1 | 1/2019 | Krellenstein et al. |
| 2019/0013943 A1 | 1/2019 | Maim |
| 2019/0018887 A1* | 1/2019 | Madisetti .............. H04L 9/3236 |
| 2019/0043050 A1 | 2/2019 | Smith et al. |
| 2019/0205932 A1* | 7/2019 | Ericson .............. G06Q 20/0658 |

* cited by examiner

BROADCAST INTENT SIGNALING USING A DECENTRALIZED NETWORK

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and methods for broadcasting an intent of a first user to a second user of a decentralized network. The computing system and methods are implemented in the decentralized network that implements a distributed ledger that backs one or more decentralized identities (DID) for one or more users of the computing system. Intent from first users of the computing system is received. The intent data defines potential interactions between the first users and second users of the computing system. Broadcast messages are generated. The broadcast messages include a DID for each of the first users and information specifying the potential interactions. The generated broadcast messages are provided to the second users.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein are related to computing systems and methods for broadcasting an intent of a first user to a second user of a decentralized network. The computing system and methods are implemented in the decentralized network that implements a distributed ledger that backs one or more decentralized identities (DID) for one or more users of the computing system. Intent from first users of the computing system is received. The intent data defines potential interactions between the first users and second users of the computing system. Broadcast messages are generated. The broadcast messages include a DID for each of the first users and information specifying the potential interactions. The generated broadcast messages are provided to the second users.

The embodiments disclosed herein provide a technical advance over conventional systems which do not utilize a distributed network that uses decentralized identifiers. For example, embodiments disclosed herein allow the computing system to generate broadcast messages that broadcast an intent of the first users to interact with second users in a specific way. These interactions may be to sell or buy a product or service. They may also be to interact with second user in some other way such as collaboration on a research product. These broadcast messages may be of interest to second users and may be provided to them and then used to facilitate communication between the first and second users. This is a technical advance in that parties that may not have otherwise been aware of each other are now able to communicate with each other. This advantageously provides for enhanced markets and other platforms where the first and second users are able to interact with each other in new ways.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
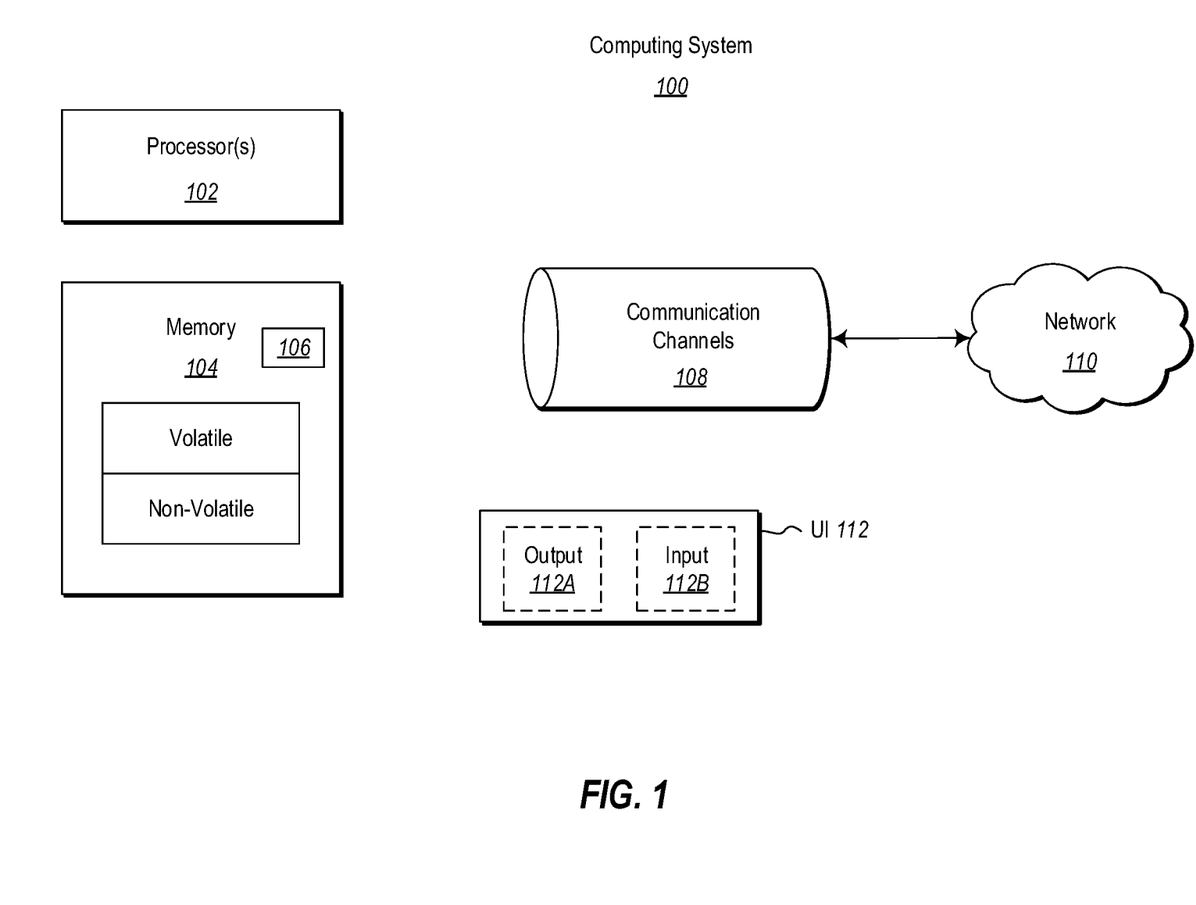
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
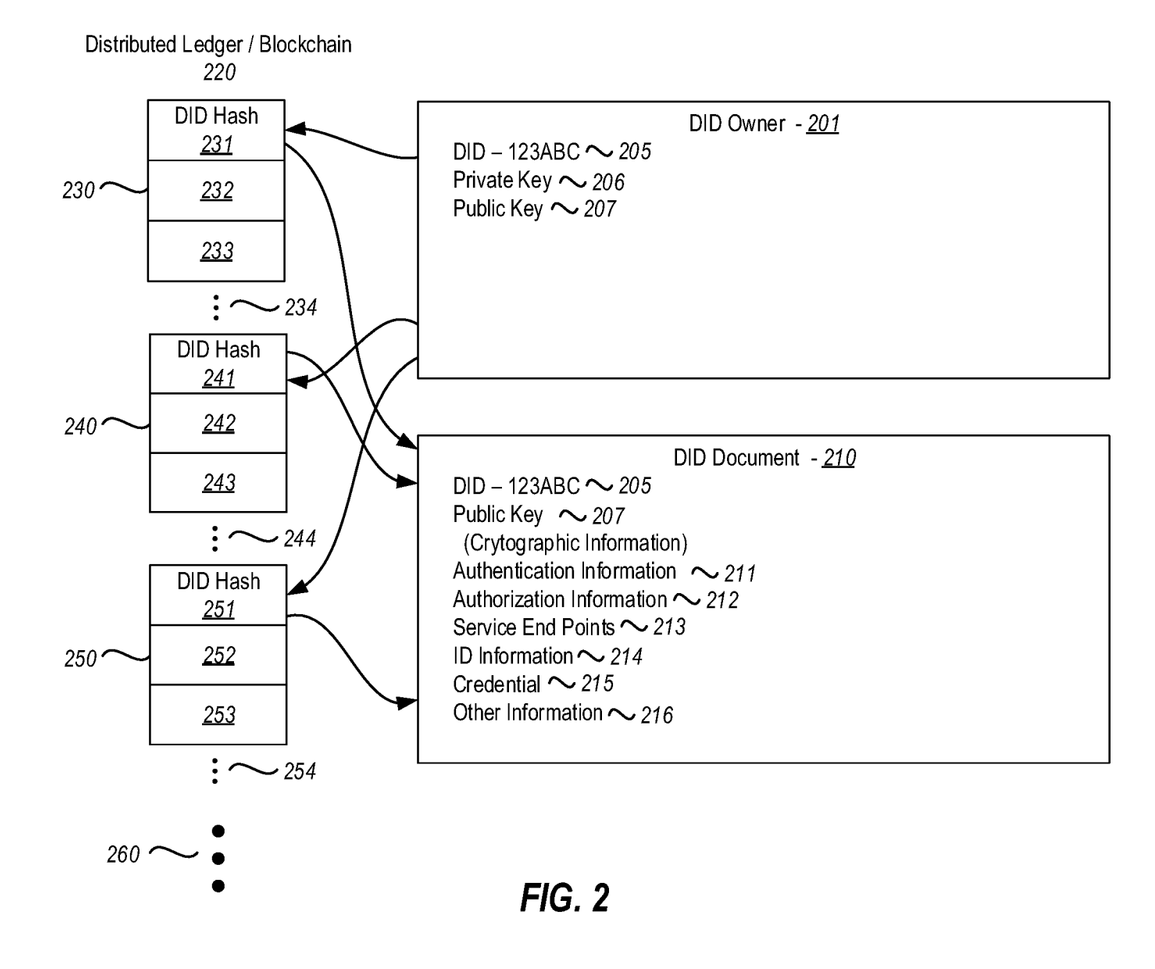
FIG. 2 illustrates an example environment for creating a Decentralized Identification (DID)

Some introductory discussion of a decentralized identification (DID) and the environment is which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource Identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein) Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. Thus, the private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child in no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exits. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

Figure 3:
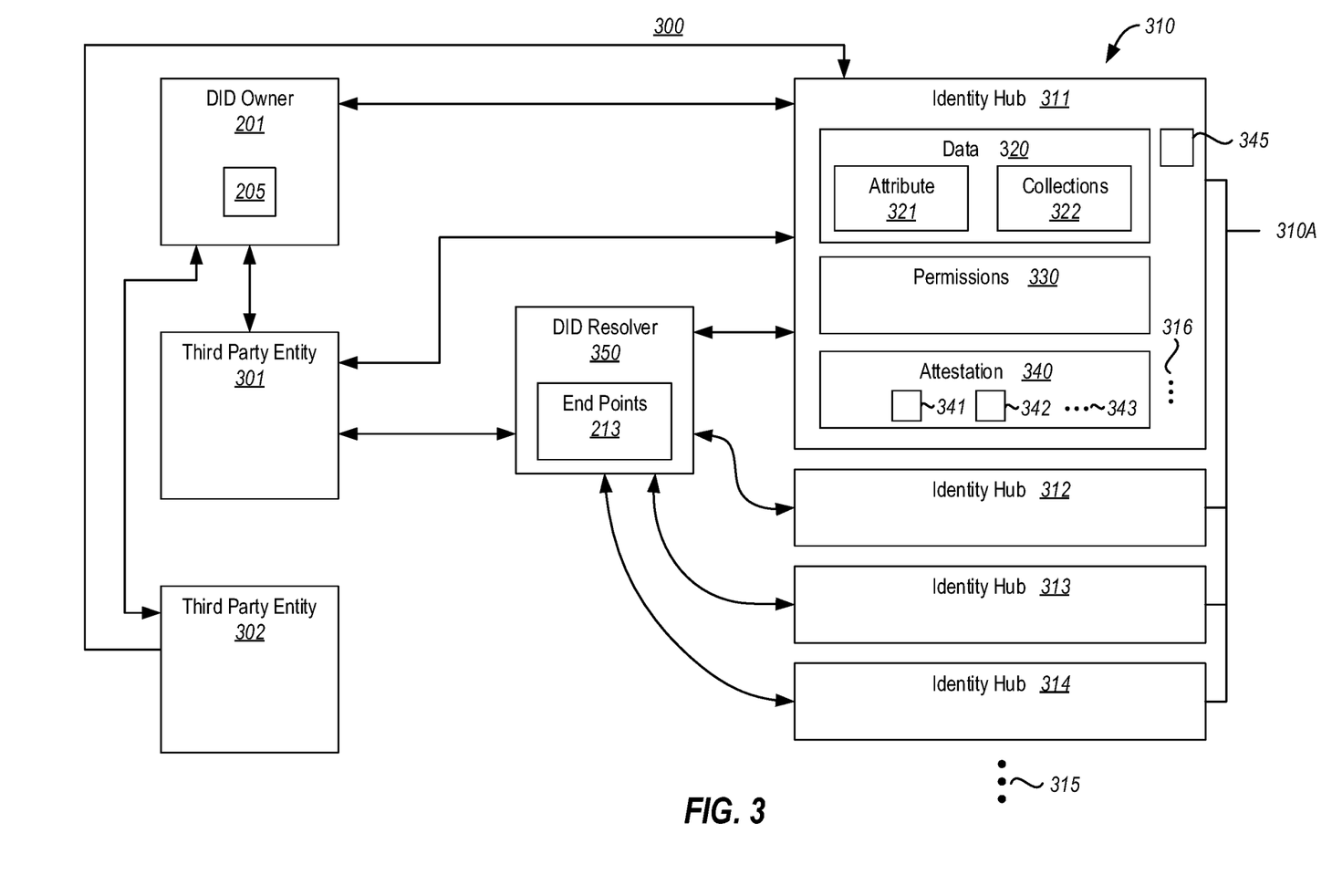
FIG. 3 illustrates an example environment for DID identity hubs.

FIG. 3 illustrates an embodiment of an environment 300 in which a DID such as DID 205 may be utilized. Specifically, the environment 300 will be used to describe the use of the DID 205 in relation to one or more decentralized storage devices or identity hubs. It will be noted that FIG. 3 may include references to elements first discussed in relation to FIG. 2 and thus use the same reference numeral for ease of explanation.

As illustrated in FIG. 3, the environment 300 includes various storage devices or identity hubs 310 that are associated with the DID owner 201. For example, the storage devices or identity hubs 310 may include a first identity hub 311, a second identity hub 312, a third identity hub 313, and a fourth identity hub 314. The ellipses 315 represent that that there may be any number of additional storage devices or identity hubs as circumstances warrant. It will be noted that the identity hubs 310 are considered to be decentralized storage devices in that, as will be explained in more detail to follow, the identity hubs are addressable through use of the DID 205 and its corresponding DID document 210. In addition, although the identity hubs may be hosted by a third party, all access to the identity hubs is based on permissions determined by the DID owner 201.

In one embodiment, the first identity hub 311 may be implemented at a first cloud storage provider, the second identity hub 312 may be implemented at a second cloud storage provider, the third identity hub 313 may be implemented as part of home computing system, and the fourth identity hub 314 may be implemented as part of a mobile device. Thus, the various identity hubs 310 may be implemented across different service providers such as the two different cloud storage providers. Further, the various identity hubs 310 may be implemented as a combination of storage provided by third parties such as the two cloud storage providers and memory devices owned by DID owner 201 such as the home computing system and mobile device. Of course, the various identity hubs 310 may be implemented as other storage devices and services as circumstances warrant.

In one embodiment, the identity hubs 310 may be multiple instances of the same identity hub. This is represented by the line 310A. Thus, the various identity hubs 310 may include at least some of the same data and services. Accordingly, if any change is made to one of the identity hubs 310, the change may be reflected in the remaining identity hubs. For example, the first identity hub 311 and second identity hub 412 are implemented in cloud storage and thus may be able to hold a large amount of data. Accordingly, a full set of the data may be stored in these identity hubs. However, the identity hubs 312 and 313 may have less memory space. Accordingly, in these identity hubs a descriptor of the data stored in the first and second identity hubs may be included. Alternatively, a record of changes made to the data in other identity hubs may be included. Thus, changes in one of the identity hubs 310 are either fully replicated in the other identity hubs or at least a record or descriptor of that data is recorded in the other identity hubs.

Because the identity hubs may be multiple instances of the same identity hub, only a full description of the first identity hub 311 will provided as this description may also apply to the identity hubs 312-315. As illustrated, identity hub 311 may include data storage 320. The data storage 320 may be used to store any type of data that is associated with the DID owner 201. In one embodiment the data may be a collection 322 of a specific type of data corresponding to a specific protocol. For example, the collection 322 may be medical records data that corresponds to a specific protocol for medical data. The collection 322 may be any other type of data.

The data store 320 may also store attribute data 321. The attribute data may include attribute information that describe various interests and likes of the DID owner 201. For example, such attribute information may include favorite foods, favorite sports, favorite hobbies, favorite vacation spots, favorite entertainment, and the like of the DID owner 201. Thus the attribute data 321 about the DID owner 201 may be information provided by the DID owner 201 or it may be information that is gleamed from interactions with a third party.

In some embodiments, the data store may also include telemetry data that includes information about the data usage of the DID owner 201. For example, the telemetry data may include data about which web sites the DID owner 201 visits, how long he or she visits the web sites, and which devices are used access the websites. The telemetry data may also include data about which products the DID owner 201 purchases and where such products are purchased. Accordingly, the telemetry data may be any data about the usage patterns of the DID owner 201.

In some embodiments, the identity hub 311 may have a permissions module 330 that allows the DID owner 201 to set specific authorization or permissions for third parties such as third parties 301 and 302 to access the identity hub. For example, the DID owner 201 may provide access permission to his or her spouse to all the data 320. Alternatively, the DID owner 201 may allow access to his or her doctor for any medical records. It will be appreciated that the DID owner 201 may permission to any number of third parties to access a subset of the data 320. This will be explained in more detail to follow.

For example, a first subset of the data may have a permission that allows the data to be publicly exposed, but that does not include any authentication to the DID owner 201. This type of data may be for relatively unimportant data such as color schemes and the like. A second subset of the data may have a permission that that allows the data to be publicly exposed and that includes authentication to the DID owner 201. A third subset of the data may have a permission that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a permission that restricts this data to a subset of third parties. This may require that public keys associated with the subset of third parties be used to decrypt the data. For example, the DID owner 201 may cause the permission to specify that only public keys associated with friends of the DID owner 201 may decrypt this data.

In some embodiments, the identity hub 311 may include an attestation store 340 that includes various attestations 341, 342 and any number of additional attestations as illustrated by the ellipses 343 associated with the DID owner 201. An attestation may also be referred to as a credential or verified credential such as the credential 215 of the DID document 210. That is, the attestation or verified credential may provide information about the DID owner 201 and/or about various entities the DID owner 201 has interactions with. As mentioned previously, the attestations 340 may be (but are not limited to) a qualification, an achievement, a government ID, a government right such as a passport or a driver's license, a payment provider or bank account, a university degree or other educational history, employment status and history, or any other information about the DID owner 201's background. Accordingly, the attestations 340 may be used to verify the identity of the DID owner 201.

The identity hub 311 may also have a messaging module 345. In operation, the messaging module allows the identity hub to receive messages such as requests from parties such as third parties 301 and 302 to access the data and services of the identity hub. In addition, the messaging module 345 allows the identity hub 311 to respond to the messages from the third parties and to also communicate with a DID resolver 350. The DID resolver 350 may be a service, application, or module that is configured in operation to search the distributed ledger or blockchain 220 for DID documents associated with DIDs. Accordingly, in the embodiment the DID resolver 350 may search the distributed ledger or blockchain 220 using the DID 205, which may result in the DID resolver 350 finding the DID document 210. The ellipses 316 represent that the identity hub 311 may have additional services as circumstances warrant.

In one example embodiment, the DID owner 201 may provide the DID 205 to the third party entity 301 so that the third party may access data or services stored on the identity hub 311. Once the third party 301 has access to the DID 205, he or she may access the DID resolver 350 to access the DID document 210. As previously discussed, the DID document 210 may include an end point 213 that is an address or pointer to the identity hub 311. The third party 301 may then use the address or pointer to access the identity hub 311.

The third party 301 may send a message to the messaging module 345 asking for permission to access data in the identity hub 311. The messaging module 345 may then send a message to the DID owner 201 asking if the third party 301 should be given access to the data. Because the DID owner 201 desires to provide access to this data, the DID owner 201 may allow permission to the third party 301 and this permission may be recorded in the permissions 330.

The messaging module 345 may then message the third party 301 informing the third party that he or she is able to access the data. The identity hub 311 and the third party 301 may then directly communicate so that the third party may access the data. It will be noted that in many cases, it will actually be an identity hub associated with the third party 301 that communicates with the identity hub 311. However, it may be a device of the third party 301 that does the communication.

Advantageously, the above described process allows the identity hub 311 and the third party 301 to communicate and to share the data without the need for the third party to access the identity hub 311 in the conventional manner. Rather, the communication is provisioned in the decentralized manner using the DID 205 and the DID document 210. This advantageously allows the DID owner to be in full control of the process.

As shown in FIG. 3, the third party 302 may also request permission for access to the identity hub 311 using the DID 205 and the DID document 210. Accordingly, the embodiments disclosed herein allow access to any number of third parties to the identity hubs 310.

Figure 4:
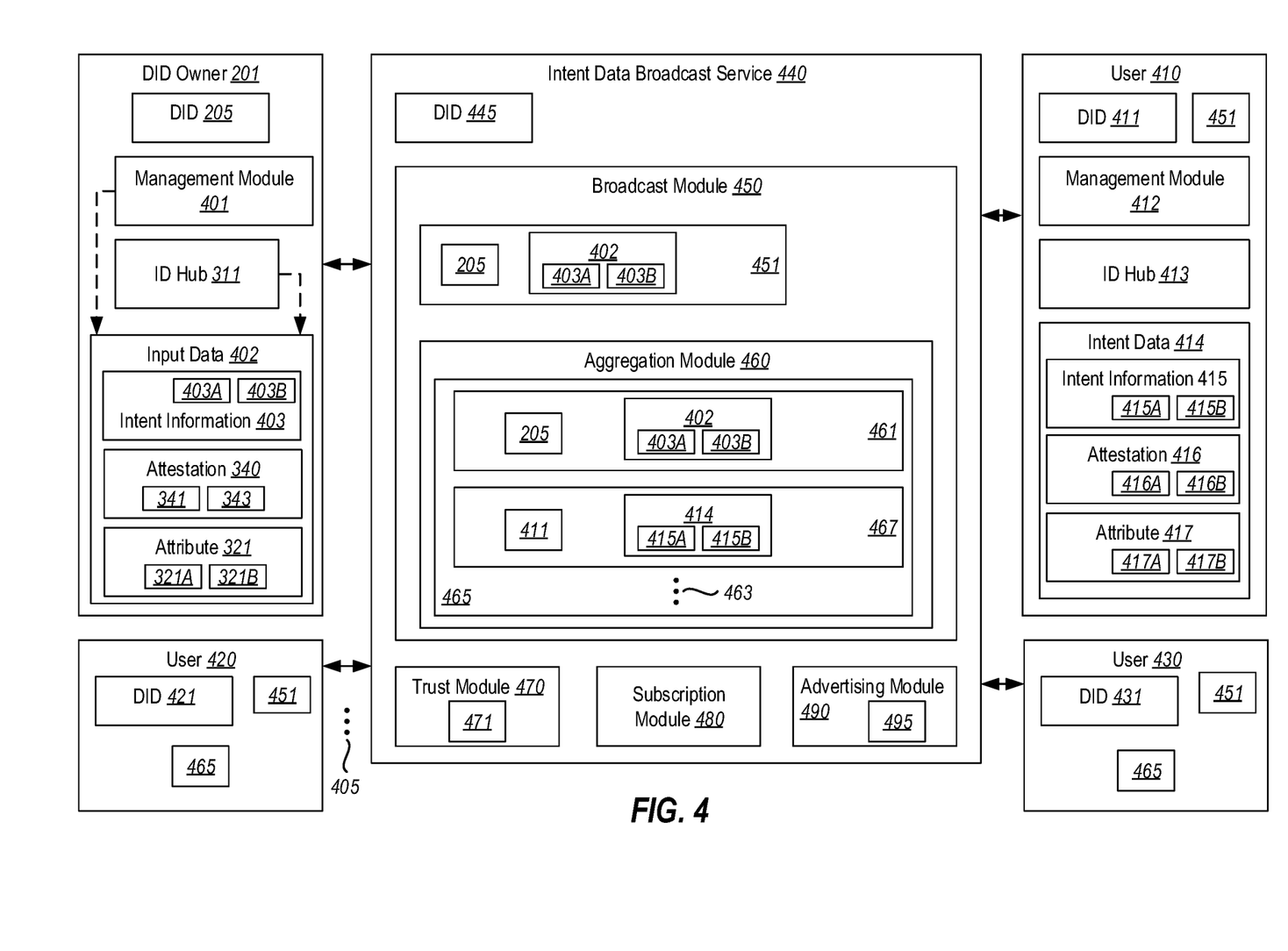
FIG. 4 illustrates an embodiment for broadcasting an intent of a first user to a second user of a decentralized network.

FIG. 4 illustrates an embodiment of an environment 400 in which a DID such as DID 205 may be utilized. Specifically, the environment 400 will be used to describe the use of the DID 205 in relation to an intent broadcast service. It will be noted that FIG. 4 may include references to elements first discussed in relation to FIGS. 2-3 and thus use the same reference numeral for ease of explanation.

As illustrated, the environment 400 includes a user 410, a user 420, a user 430, and any number of additional users as illustrated by the ellipses 405 in addition to the DID owner 201. As shown in FIG. 4, the user 410 may own or have control of a DID 411, the user 420 may own or have control of a DID 421, and the user 430 may own or have control of a DID 431. It will be noted that the DID 411, the DID 421, and the DID 431 are generated and stored on the distributed ledger or blockchain 220 in the manner previously described for the DID 205. Thus, the users 410, 420, and 430 may also have a DID document associated with their respective DIDs and may also have one or more identity hubs that include attestations that may be used to verify the identity of the users 410, 420, and 430. Accordingly, the DID documents and identity hubs associated with the users 410, 420, and 430 may be similar to the DID document 210 and the identity hubs 310 previously described in relation to the DID owner 201 and thus do not need to be explained in further detail. Although not illustrated, each of the users 405 may also have an associated DID and DID document. It will also be noted that the users 410, 420, and 430 (and the users 405) may be human users, institutional users such businesses or organizations, or any other type of reasonable owner.

As illustrated, the DID owner 201 may control may control a management module 401. The management module 401 may be used by the DID owner 201 to generate the DID 205 and may be an example of a DID wallet or the like. The management module 401 may be implanted on one or devices such as smart phone or a computer owned or used by the DID owner 201. As previously mentioned, the DID owner 201 may also have access to the identity hub 311 (or any of the identity hubs 310).

In some embodiments, the DID owner 201 may desire to broadcast intent data 402 to one or more of the users 410, 420, 430 (or perhaps any of the users 405) that indicates that the DID owner 201 desires an interaction with one or more of the other users. For example, the DID owner 201 may desire to buy or sell a product or service. Alternatively, DID owner 201 may desire to meet up with or to or collaborate with one or more of the other users in a non-commercial manner such as a social interaction like dating. Thus, the intent data 402 may be about any type of interaction that the DID owner 201 desires to have with the one or more of the users 410, 420, 430 (or perhaps any of the users 405). Accordingly, the embodiments disclosed herein are not limited to any specific type of interaction desired by the DID owner 201 that is the subject of the intent data 402.

In some embodiments, the intent data 402 may be published or generated by DID owner 201 in his or her ID hub 311. In other embodiments, the intent data 402 may be published or generated by DID owner 201 in the management module 401. In this way, those users who receive notice of the intent data 402 from a broadcast service as will be explained in more detail follow may communicate with the ID hub 311 or the management module 401 to access the intent information 402.

The intent data 402 may include intent information 403 that may specify information about the intent. For example, intent information 403a may specify a subject of the intent, or in other words the type of interaction that the DID owner 201 desired. For example, the intent information may specify a particular product or service that the DID owner 201 desires to buy or sell. For instance, if the DID owner 201 were a landscaper then the intent information 403a might specify that he or she was offering landscaping services or that he or she was looking to buy some equipment or hire an employee. Alternatively, if the DID owner 201 was interested in collaborating with another user on a research project, then the intent information 403a might specify information about the research project.

The intent data 402 may also include intent information 403b that may provide information about how to engage with the DID owner 201 so that the one or more of the users 410, 420, and 430 may be able to interact with the DID owner 201 in the desired manner. For example, the intent information 403b may specify how specifically to communicate with the DID owner 201 a user's desire to purchase or sell a product or service specified by the intent information 403a. The intent information 403b may also specify what actions are needed to complete the interaction specified by the intent information 403a.

In some embodiments, the intent data 402 may also include the attestations 340 including attestations 341 and 342 previously described. The inclusion of one or more attestations 340 may allow the DID owner 201 to verify that he or she is competent to provide the service or product specified in the intent information 403a. For example, if the DID owner 201 is a landscaper than one or more of the attestations 340 may attest that he or she is actually a landscaper. If the DID owner 201 desired to collaborate on a research project, then the attestations 340 may attest that he or she is qualified for such research. Accordingly, the inclusion of attestations 340 in the intent data 402 provide verification about the DID owner 201 that may be helpful to one of the users 410, 420, and 430. The embodiments disclosed herein are not limited by any particular attestation included in the intent data 402 as all types of attestations are contemplated.

In some embodiments, the intent data 402 may also include attribute data 321 including attributes 321a and 321b. As previously described, the attribute data 321 may include further information about the DID owner 201. In the embodiments disclosed herein, the attribute data 321 may be used to provide additional information about the DID owner 201 relative to the subject of the intent specified in the intent information 403a. For example, if the DID owner 201 is a landscaper than one or more of the attributes 321 may specify that the DID owner does business in Seattle, Wash. The attributes may also specify how long he or she had been doing landscaping. In this way, any of the users 410, 420, or 430 who accessed the intent data 402 and needed landscaping services, but did not live in Seattle or who wanted a landscaper with more experience than the DID owner 201, would know that DID owner 201 would likely not be the person to provide such services. The embodiments disclosed herein are not limited by any particular attribute included in the intent data 402 as all types of attributes are contemplated.

As illustrated, the environment 400 includes a data broadcast service 440. In one embodiment, the data broadcast service 440 may be implemented by a third party such as the provider of the DID management module 401 and/or the provider of the identity hubs 310. In some embodiments, the data broadcast service 440 may be hosted on a server computer that is separate from any devices owned by the DID owner 201 or the users 410, 420, and 430. In other embodiments, the data broadcast service may be hosted by the management module 401 on a device owned by the DID owner 201.

As illustrated, the data broadcast service 440 may include a DID 445. The DID 445 may be generated and stored on the distributed ledger or blockchain 220 in the manner previously described for the DID 205. Although not illustrated, the DID 445 may also be associated with a corresponding DID document that defines how to use the DID 445 in a manner similar to the DID document 210. The DID 445 may also have an associated private and public key pair that allow the DID 445 to be used by third parties to access the data broadcast service 440.

It will be noted that since the data broadcast service 440 includes the DID 445, the data broadcast service 440 is able to interact with the DID owner 201 and the users 410, 420, and 430 in a decentralized manner. Thus, even though the data broadcast service 440 may be owned by a business entity or the like, because the data broadcast service 440 is part of the decentralized network backed by the distributed ledger or blockchain 220, it is unable to ascertain any identification information about the DID owner 201 and the users 410, 420, 430, and 405 without those users granting permission to the data broadcast service 440. Accordingly, the DID owner 201 and the users 410, 420, 430, and 405 maintain control over their respective identities in relation to the data broadcast service 440.

The data broadcast service 440 may include broadcast module 450. The broadcast module 450 may represent the physical elements and software elements that may be associated with the data broadcast service 440 to broadcast data. In operation the broadcast module 450 may receive from the DID owner 201 the intent data 402 including the intent information 403*a* and 403*b*. The broadcast module may then generate a broadcast message 451 that includes the DID 205 as an identifier for the DID user 201 and the intent data 402 including the intent information 403*a* and 403*b*. Although not illustrated for ease of explanation, the intent data 402 included in the broadcast message 451 may also include one or attestations 340 and one or more attributes 321 as previously described.

The broadcast module 450 may then broadcast the broadcast message 451 to the user 410, the user 420, and the user 430 as shown in FIG. 4. Although not illustrated, the broadcast message 451 may also be sent to any number of the additional users 405, which in some embodiments may be in the thousands or perhaps even in the millions of users. Accordingly, the embodiments disclosed herein provide a way for the DID owner 201 to broadcast a desired intent to a large number of users in a decentralized manner.

Upon receipt of the broadcast message 451, the users 410, 420, and 430 may store the intent data 402 in an identity hub they control or some other location. As mentioned previously, the intent information 403*a* may provide details about the interaction that the DID owner 201 is interested in. The intent information 403*b* may include information about how the users may engage with the DID owner 201. In addition, since the broadcast message 451 includes the DID 205 of the DID owner 201, the users 410, 420, and 430 may use the DID 205 and the distrusted ledger or blockchain 220 and DID document 210 in the manner previously described to contact the DID owner 201. If the any of the users 410, 420, and 430 are interested in interacting with the DID owner 201 in the manner specified by the intent data 402, then they may do so according to the intent information 403*b*. For example, they may access the ID hub 311, where they may be able to find additional information about the specific interaction desired by the DID owner 210 and may also be able to send various messages to the DID owner 201 regarding the desired interaction. Alternatively, any of these users may simply ignore the broadcast message 451 if they are not interested in the interaction that is specified in the intent data 201.

For example, suppose the DID owner 201 was interested in taking offers on his or her house. Accordingly, the DID owner 201 could generate intent data 402 having intent information 403*a* that specified that the house was for sale and intent information 403*b* that specified how to engage with the DID owner 201. The intent data could also include attestations 340 and attributes 321 that provided additional information about the DID owner 201 that would be relevant to buying a house such as location. The intent data could be stored in the ID hub 311 or the management module 401 and provided to the broadcast service 440.

The broadcast module 450 may then generate the broadcast message 451 in the manner previously described and provide the broadcast message to the users 410, 420, and 430. If the the user 430 were interested in buying a house in the location of the house of the DID owner 201, the user 430 could engage with the DID owner 201 according to the intent information 403*a* and also using the DID 205.

In some embodiments, as illustrated in FIG. 4, the user 410 may control may control a management module 412 that functions in a similar manner as the management module 401. In addition, the user 410 may have access to an identity hub 413 similar to the identity hub 311.

Accordingly, the user 410 may generate intent data 414 in either the management module 412 or the identity hub 413. In a manner similar to the intent data 402, the intent data 414 may include intent information 415 that may include intent information 415*a* and may include intent information 415*b*. The intent information 415*a* and 415*b* may correspond to the intent information 403*a* and 403*b* respectively that was previously described and thus need not further explanation. The intent data 414 may also include attestations 416 including attestations 416*a* and 416*b* and may also include attributes 417 including attributes 417*a* and 417*b*. The attestations 416 and attributes 417 may be stored in the identity hub 413. The attestations 416 and attributes 417 may correspond to attestations 340 and attributes 321 previously described in relation to the DID owner 201 and thus need no further explanation.

Suppose that the user 410 also was interested in taking offers on his or her house. Accordingly, the user 410 could generate intent data 414 having intent information 415*a* that specified that the house was for sale and intent information 415*b* that specified how to engage with the user 410. The intent data 414 could also include one or more of the attestations 416 and attributes 417 as circumstances warranted.

Accordingly, in such embodiments the broadcast module 450 may also include an aggregation module 460. In operation, the aggregation module 460 may be able to determine intent data from multiple users that is related to or based on similar desired interactions specified by the intent data. For example, multiple users may desire to sell their respective houses. The aggregation module 460 may then generate a single aggregated broadcast message 465 combines all the intent data.

For example, as shown in FIG. 4 the aggregation module 460 may generate a broadcast message 461 that includes the DID 205 of the DID owner 201 and the intent data 402 including the intent information 403*a* and 403*b* and any attestations and attributes as needed. As mentioned above, in this example embodiment the intent information 403*a* specified that the house of DID owner 201 was for sale and the intent information 403*b* specified how to engage with the DID owner 201.

Likewise, the aggregation module 460 may generate a broadcast message 462 that includes the DID 411 of the user 410 and the intent data 414 including the intent information 415*a* and 415*b* and any attestations and attributes as needed. Since in the current embodiment the user 410 desired to sell his or her house, the intent information 415*a* may specify that the house is for sale and the intent information 415*b* may specify how to engage with the user 410. The ellipses 463 represent that any number of additional users may also provide intent data related to selling a house that may be used to generate any number of additional broadcast messages.

The aggregation module 460 may then generate the aggregated broadcast message 465 that includes all the intent data from the various users that is related to the selling of a house. The aggregated broadcast message 465 may then be sent to the users 420 and 430 and any number of the additional users 405. As previously discussed in relation to the broadcast message 451, the users who receive the aggregated broadcast message 465 may store the message in an identity hub and may use the intent information to select various houses they are interested in potentially buying and to engage with the DID owner 201, user 410, or other users. Of course, they may also simply ignore the aggregated broadcast message 465 if desired.

As may be appreciated, one or more of the users 420 and 430 may receive the broad cast message 451 or the aggregated broadcast message 465 from the intent data broadcast service 440 and may wonder if the party generating the intent information is trustworthy or not. This may be particularly true if, as may likely be the case, the users 420 and 430 have never heard of or had any interactions with the DID owner 201 or the user 410. In some embodiments, the attestations 340 and 416 may provide enough assurance to the users 420 and 430. However, in other embodiments the DID owner 201 or the user 410 may not have included the attestations in the intent data or they may not have accumulated enough attestations. Alternatively, the users 420 and 430 may not believe the attestations or may not trust them. Accordingly, the intent data broadcast service 440 may also include a trust module 470. In operation, the trust module 470 may determine a trust score 471 for various users associated with the intent broadcast service 440. The trust score 471 may be based, in one embodiment, on a determination of how often various users used a broadcast message from another user to interact with the user who sent the broadcast message in the desired way in satisfactory manner. In other words, trust score 471 measures how often did the user who used the broadcast message to interact with the sending user have a positive experience.

For example, suppose that the DID owner 201 had a history of selling houses or doing other business using the intent data broadcast service 440. In such instance, the trust module 470 may determine how often another user such as the users 410, 420 and 430 used a broadcast message from the user DID owner 201. If a certain percentage of users did use a broadcast message in a satisfactory manner, perhaps measured based on a threshold, then a relatively high trust score 471 may be generated. Conversely, if only a small percentage of the users used a broadcast message is a satisfactory manner or if perhaps the DID owner 201 had only used the intent data broadcast service 440 for a short period of time, then a relatively low trust score 472 may be generated.

In response to receiving the broadcast message, one or more of the users 410, 420, and 430 may access the trust score 471 from the intent data broadcast service 440. The users 410, 420, and 430 may then make a determination about whether to interact with the DID owner 201 or not based on the trust score 471. Advantageously, the use of the trust score 471 helps to provide confidence to the various users associated with the intent data broadcast service 440 in their interactions with each other.

The intent broadcast data service 440 may also include a subscription module 480. In operation, the subscription module 480 may allow a user such as user 430 to subscribe to broadcast messages that it is interested in. For instance, in the example above the DID owner 201 and user 410 generated broadcast messages that specified a desired interaction of selling their house. If the user 430 is a user that is looking to buy a house, the user 430 may subscribe to only broadcast messages that are related to selling houses. In this way, the user 430 does not receive broadcast messages related to other types of interactions such as products and services that he or she is not interested in. Thus, the subscription module 480 allows the user 430 to receive more focused data.

The intent data broadcast service 440 may also include an advertising module 490. In operation, the advertising module 490 may allow any user associated with the intent data broadcast service 440 to generate an advertisement 495 related to a service, a product, or the like. This advantageously helps to ensure that a specific user is at the least included in any broadcast message that is related to the advertisement 496.

For example, suppose the DID owner 201 was a patent lawyer. In such case, he or she may have the advertising module 490 generate an advertisement 495 that may associate the DID 205 with being a patent attorney. At a later time when the intent data broadcast service 440 determines in the manner previously described that the user 420 may be interested in hiring a patent attorney, the intent data broadcast service 440 may ensure that a broadcast message 451 from the DID owner 201 having intent data 402 related to patent law services is sent to the user 420.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
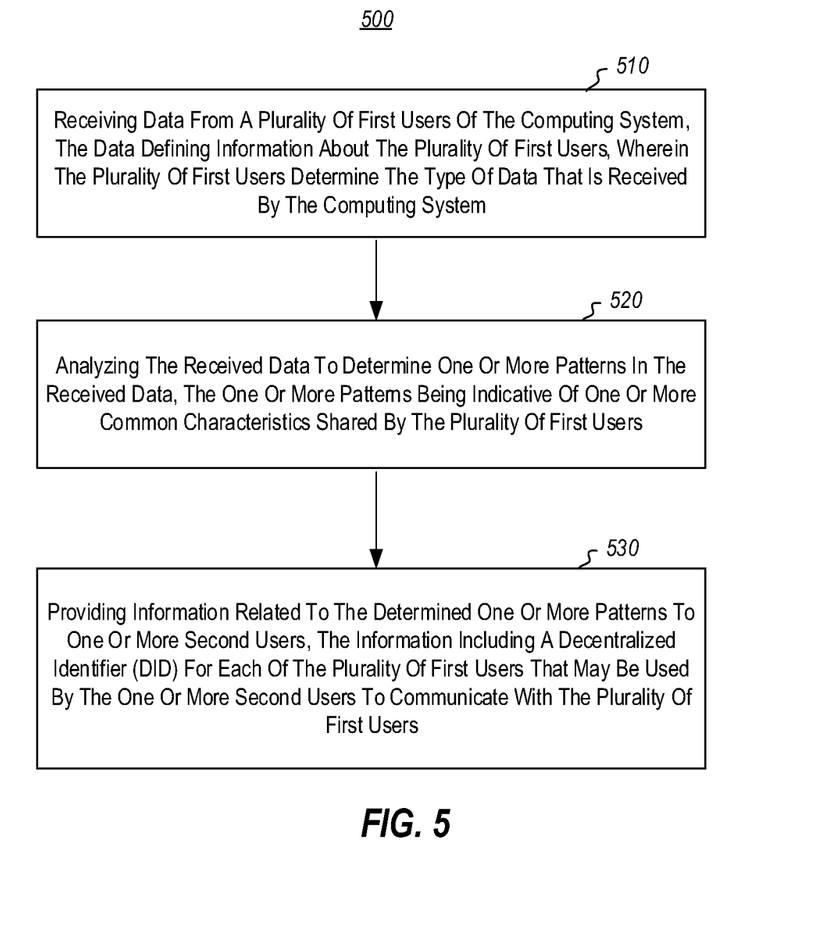
FIG. 5 illustrates a flow chart of an example method for broadcasting an intent of a first user to a second user of a decentralized network.

FIG. 5 illustrates a flow chart of an example method 500 for broadcasting an intent of a first user to a second user of the decentralized network. The method may be implemented in a computing system that is implemented in the decentralized network that implements a distributed ledger, the distributed ledger being configured to back one or more decentralized identities (DID) for one or more users of the computing system. The method 500 will be described with respect to one or more of FIGS. 2-4 discussed previously.

The method 500 includes receiving intent data from one or more first users of the computing system (510). The intent data defines one or more potential interactions between the one or more first users and one or more second users of the computing system. For example, as previously described the intent data broadcast system 440 may receive the intent data 402 from the DID owner 201 or the intent data 414 from the user 410. The intent data may define a potential interaction between the DID owner 201 and/or the user 410 and the users 420, 430, and potentially any number of users 405. As described, the potential interactions may be a desire to sell or buy a particular product or service. The potential interactions may be a non-commercial interaction such as collaboration on a research project or some social interaction such as dating or the like.

The method 500 includes generating one or more broadcast messages (520). The broadcast messages include a DID for each of the one or more first users and information specifying the potential one or more interactions. For example, as previously explained the broadcast module 450 may generate a broadcast message 451 or the aggregated broadcast message 265. The broadcast messages may include the DID 205 for the DID owner 201 and/or the DID 411 of the user 410. The broadcast messages may also include the intent information 403a and 415a that specifies a subject or type of interaction of the intent. The broadcast messages may also include the intent information 403b and 415b that specify how to engage with the DID owner 201 or the user 410.

The method 500 includes providing the generated one or more broadcast messages to the one or more second users (530). For example, as previously described the intent broadcast service 440 may provide the broadcast message 451 to one or more of the users 410, 420, or 430 or the aggregated broadcast message 465 to one or more of the users 420 and 430.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, the computing system comprising:
   one or more processors; and
   one or more computer-readable media having thereon computer-executable instructions that are structured such that, when executed by the one or more processors, cause the computing system to:
   receive intent data from one or more first users of the computing system, the intent data defining one or more interactions between the one or more first users and one or more second users of the computing system;
   generate, by the one or more first users of the computing system, one or more broadcast messages that includes a DID for each of the one or more first users and information specifying the one or more interactions; wherein the DID is owned by each of the one or more first users of the computing system; and
   provide the generated one or more broadcast messages to the one or more second users.

2. The computing system of claim 1, wherein the computer-executable instructions that are structured to further cause the computing system to:
   aggregate at least some of the one or more generated broadcast messages into a single aggregated broadcast message based on the at least some of the generated broadcast messages having a similar potential interaction.

3. The computing system of claim 1, wherein the one or more broadcast messages that are provided to the one or more second users is broadcast to all second users associated with the computing system.

4. The computing system of claim 1, wherein the one or more broadcast messages that are provided to the one or more second users is only sent to second users who have subscribed to receive the one or more broadcast messages.

5. The computing system of claim 1, wherein the computer-executable instructions that are structured to further cause the computing system to:
   generate an advertisement based on the received intent data from the one or more first users.

6. The computing system of claim 1, wherein the computer-executable instructions that are structured to further cause the computing system to:
   generate a trust score for the one or more first users, the trust score based at least in part on how often the one or more second users interacted with the one or more first users in the manner specified by the intent data.

7. The computing system of claim 1, wherein the intent data received from the plurality of first users includes one or more of attestation data and attribute data.

8. The computing system of claim 1, wherein the information specifying the potential one or more interactions includes a subject of the one or more interactions and information specifying how to engage with the one or more first users.

9. In a computing system that is implemented in a decentralized network that implements a distributed ledger, the distributed ledger being configured to back one or more decentralized identities (DID) for one or more users of the computing system, a method for broadcasting an intent of a first user to a second user of the decentralized network, the method comprising:
   receiving intent data from one or more first users of the computing system, the intent data defining one or more interactions between the one or more first users and one or more second users of the computing system;

generating, by the one or more first users of the computing system, one or more broadcast messages that includes a DID for each of the one or more first users and information specifying the one or more interactions; wherein the DID is owned by each of the one or more first users of the computing system; and providing the generated one or more broadcast messages to the one or more second users.

10. The method of claim 9, further comprising:

aggregating at least some of the one or more generated broadcast messages into a single aggregated broadcast message based on the at least some of the generated broadcast messages having a similar potential interaction.

11. The method of claim 9, wherein the one or more broadcast messages that are provided to the one or more second users is broadcast to all second users associated with the computing system.

12. The method of claim 9, wherein the one or more broadcast messages that are provided to the one or more second users is only sent to second users who have subscribed to receive the information.

13. The method of claim 9, further comprising:

generating an advertisement based on the received intent data from the one or more first users.

14. The method of claim 9, further comprising:

generating a trust score for the one or more first users, the trust score based at least in part on how often the one or more second users interacted with the one or more first users in the manner specified by the intent data.

15. The method of claim 9, wherein the intent data received from the plurality of first users includes one or more of attestation data and attribute data.

16. The method of claim 9, wherein the information specifying the potential one or more interactions includes a subject of the one or more interactions and information specifying how to engage with the one or more first users.

17. A computer program product comprising one or more computer-readable storage device having thereon computer-executable instructions that are structured such that, when executed by one or more processors of a computing system, cause the computing system to perform a method for broadcasting an intent of a first user to a second user of the decentralized network, the method comprising:

receiving intent data from one or more first users of the computing system, the intent data defining one or more interactions between the one or more first users and one or more second users of the computing system;

generating, by the one or more first users of the computing system, one or more broadcast messages that includes a DID for each of the one or more first users and information specifying the one or more interactions; wherein the DID is owned by each of the one or more first users of the computing system; and providing the generated one or more broadcast messages to the one or more second users.

18. The computer program product of claim 17, further comprising:

aggregating at least some of the one or more generated broadcast messages into a single aggregated broadcast message based on the at least some of the generated broadcast messages having a similar potential interaction.

19. The computer program product of claim 17, wherein the intent data received from the plurality of first users includes one or more of attestation data and attribute data.

20. The computer program product of claim 17, wherein the information specifying the potential one or more interactions includes a subject of the one or more interactions and information specifying how to engage with the one or more first users.

\* \* \* \* \*